Feb. 19, 1957  M. FITZGERALD  2,782,011
HOPPERS
Filed June 19, 1953  2 Sheets-Sheet 1
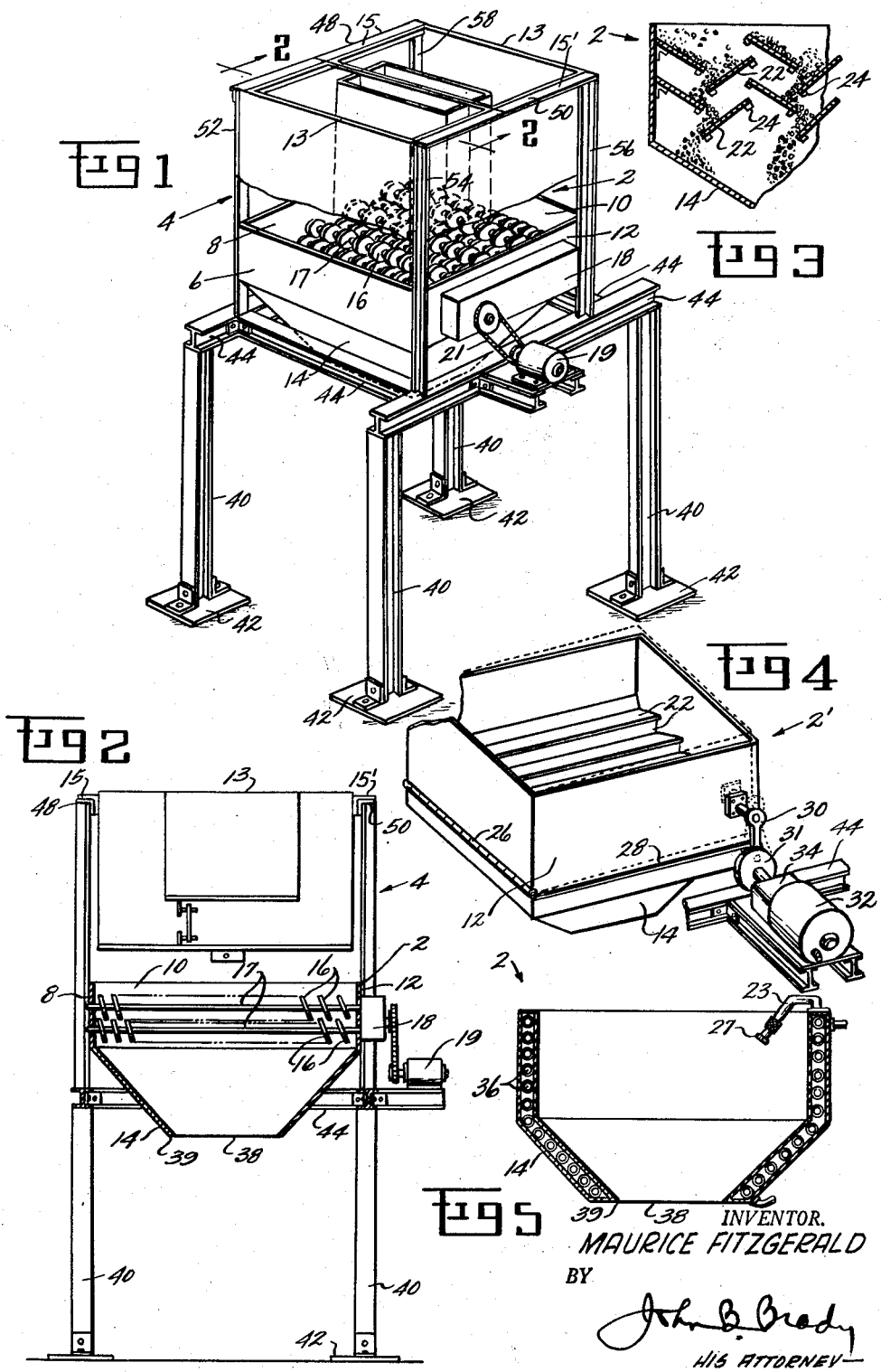
INVENTOR.
MAURICE FITZGERALD
BY
John B. Brady
HIS ATTORNEY

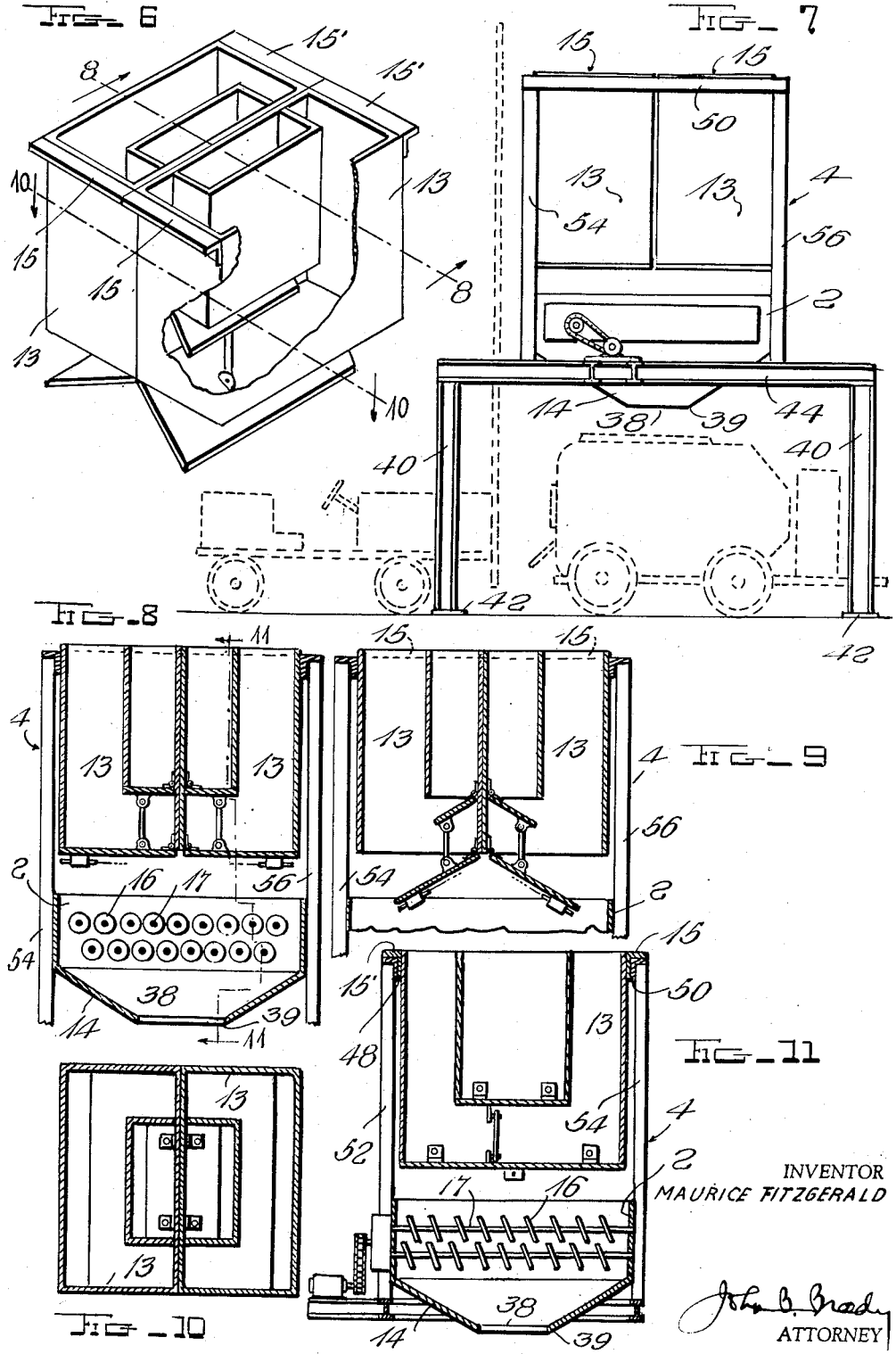

ns patent

United States Patent Office 2,782,011
Patented Feb. 19, 1957

2,782,011

HOPPERS

Maurice Fitzgerald, Yonkers, N. Y., assignor to Sho-Me, Inc., New York, N. Y., a corporation of New York Application June 19, 1953, Serial No. 362,872

2 Claims. (Cl. 259—6)

This application is an improvement over my copending application Serial Number 164,065, filed May 25, 1950, now Patent 2,651,436, dated September 18, 1953, entitled Containers for Holding and Transporting Materials to be Held Separately.

My invention relates to the hoppers to hold the contents of the container which is the subject of my copending application above referred to.

As explained in my copending application, the containers hold material separately and are adapted to allow such materials to be dumped into the hopper.

The principal object of my invention is to provide a hopper into which the contents of one or more of the containers may be dumped.

Another object of my invention is to provide a hopper which will hold the containers until it is desired to dump the contents.

Another object of my invention is to provide a hopper which will pre-mix the material as it is dumped from the container.

Another object of my invention is to provide a hopper which may be heated or cooled.

Another object of my invention is to provide a hopper which will dispense its contents in controlled amounts.

The means for accomplishing the foregoing objects may be more readily understood by reference to the accompanying drawings, in which:

Fig. 1 is a perspective view showing the hopper of my invention mounted in a frame;

Fig. 2 is a vertical sectional view taken on lines 2—2 of Fig. 1;

Fig. 3 is a fragmentary view, partly in section, of a baffle type pre-mixing means;

Fig. 4 is a perspective view of a modified form of my invention showing a vibrating type of hopper;

Fig. 5 is a further detail of my invention showing a heated hopper;

Fig. 6 is a perspective view of the receptacles which are adapted to hold and discharge different materials into the hopper for delivery to the collecting means;

Fig. 7 is a schematic view showing the receptacles mounted in position on the top frame for discharge into the hopper therebeneath and delivery to the mobile carriers;

Fig. 8 is a transverse vertical sectional view taken through the receptacles substantially on line 8—8 of Fig. 6 and showing the receptacles mounted in the top frame above the hopper, the view showing the receptacles closed;

Fig. 9 is a view similar to the view shown in Fig. 8 but illustrating the receptacles open for discharging the different materials therein into the hopper;

Fig. 10 is a transverse sectional view taken substantially on line 10—10 of Fig. 6; and Fig. 11 is a vertical sectional view taken substantially on line 11—11 of Fig. 8.

As shown in the drawings, I provide a hopper 2 which may be mounted in a frame 4. In practice, I desire the hopper 2 to be of sufficient size to accommodate the contents of two of the containers 13 shown in phantom in Fig. 1 of the type shown in my Letters Patent 2,651,436 supra. The containers 13 may be transported with the material to be mixed loaded therein and the containers 13 moved to a position within frame 4 to enable the contents to be released therefrom into the hopper 2. The upper portion of frame 4 serves as a guide for the several containers 13 of the type shown in my Letters Patent 2,651,436 as aforesaid. The containers 13 each include means for discharging the materials carried thereby into the hopper 2. The frame 4 is mounted on a platform 44 supported by legs 40 seated on butt plates 42. I have found that the platform 44 and legs 40 may be satisfactorily made of eye-beams riveted together substantially as shown, but, if desired, any suitable material may be employed such as pipe or wood. It may be desired to assemble the platform 44 in such a manner that it is held together by driftpins or by the "Safeway" coupling where the work is transitory, such as in cement road construction. The platform 44 should be of sufficient dimensions to permit trucks to be run underneath and within the legs 40.

Since the hopper 2 is necessarily made of strong material, it may be mounted on the platform 44 intermediate the frame 4 formed by the corner posts 52, 54, 56 and 58 held in parallel by tie-pieces 48 and 50 as shown in Fig. 1.

To lend strength, the sides 6, 8, 10 and 12 of the hopper 2 may be fastened to the corner-posts 52, 54, 56 and 58. The containers 13 hang over the hopper 2 by means of their flanges 15 and 17 resting on the tie-pieces 48 and 50, as shown in Fig. 2.

I provide that the materials in the container 13 may be pre-mixed after being dumped onto the hopper 2. For illustrative purposes only, I have shown several means to accomplish this object. However, I do not desire to be bound or limited to only these means. The hopper 2 is provided with sides 6, 8, 10 and 12 and with a funnel 14 attached below by welding or any desired means. The usual gate 38 is provided at the base 39 of the funnel 14. Within the hopper 2 I provide baffle plates 22 supported by cross members 24 as shown in Fig. 3. The materials are pre-mixed by the reverse direction imposed as they fall into the hopper and thence into the funnel 14.

I provide another means of pre-mixing the materials as they fall into the hopper 2 by means of rotating discs 16 mounted on shafts 17 and connected by a central gearbox 18 to a source of power such as electric motor 19 driven by a chain 21. Of course, these discs may be rotated manually, if desired.

Another form of my invention provides agitation of the baffle-plates 22 to aid in the premixing, since frequently moisture causes materials, such as wet sand, to adhere to the platform. In this form of my invention, I provide that one side of the hopper 2 is hinged at 26, as shown in Fig. 4. If the hopper 2 is placed on the platform 44 intermediate the corner posts 52, 54, 56 and 58, the hinge 26 may be fastened between the posts 52 and 54. The hopper 2' is then raised and lowered in a relatively fast reciprocating motion created by a crank arm 30 attached to an eccentric gear 31 and the hopper 2', substantially as shown in Fig. 4. A power source 32 transmits power through a reduction gear train 34 to the crank arm 30. It will be seen that the rapid rise and fall of the hopper imparts agitation to the plates 22 in such a manner that a sharp jarring effect is achieved, thereby shaking off the materials adhering thereto. Of course, the plates 22 may be agitated within the hopper 2' if desired, by any of the well known means.

Since it frequently is desirable to maintain the temperature within the hopper 2 above freezing when handling materials such as wet sand at relatively low temperatures, I provide heating coils 36 surrounding the hopper 2 substantially as shown in Fig. 5. Of course, coolant may be introduced in the coils 36 if desired.

Water or other liquid may be introduced into the hopper 2 by means of a spray nozzle 27 attached to an inlet pipe 23.

Having described my invention, what I regard as new and desire to protect by Letters Patent is:

1. In an apparatus for storing and dispensing granular material, a vertically extending frame having a clear passage through opposite ends for the passage of collecting means beneath said frame, a second frame mounted on top of the aforesaid frame and extending vertically upwardly therefrom and forming a guide means above said first mentioned frame, a hopper supported by said second frame and extending to a position below the top of said first frame, the guide means formed by said second frame confining within said second frame and above said hopper, receptacles containing different materials held separately in said receptacles for discharge into said hopper, the said hopper being adapted to hold all of the different materials discharged therein from the receptacles, and means in said hopper to pre-mix said different materials as said materials are discharged into collecting means movable through said first frame beneath said hopper.

2. An apparatus for storing and dispensing granular material as set forth in claim 1 in which the guide means formed by said second frame are constituted by posts at opposite corners of said second frame for confining the removable receptacles substantially within the peripheral limits of said second frame in alignment with said hopper.

References Cited in the file of this patent

UNITED STATES PATENTS

| | | |
|---|---|---|
| 240,442 | Miller | Apr. 19, 1881 |
| 670,222 | Campbell | Mar. 19, 1901 |
| 722,782 | Weaver | Mar. 17, 1903 |
| 931,195 | Hall et al. | Aug. 17, 1909 |
| 1,224,428 | Thoma | May 1, 1917 |
| 1,324,312 | Herrmann | Dec. 9, 1919 |
| 1,925,541 | Noble | Sept. 5, 1933 |
| 2,255,468 | Kemp | Sept. 9, 1941 |
| 2,256,484 | Kemp | Sept. 23, 1941 |
| 2,561,975 | Daniel | July 25, 1951 |
| 2,599,978 | Davis et al. | June 10, 1952 |
| 2,642,206 | Reed | June 6, 1953 |

FOREIGN PATENTS

| | | |
|---|---|---|
| 540,958 | France | Apr. 25, 1922 |